(12) United States Patent
Tateishi et al.

(10) Patent No.: US 10,884,615 B2
(45) Date of Patent: Jan. 5, 2021

(54) INSPECTION ASSISTANCE DEVICE, INSPECTION ASSISTANCE METHOD, AND PROGRAM

(71) Applicant: Mitsubishi Hitachi Power Systems, Ltd., Kanagawa (JP)

(72) Inventors: Koki Tateishi, Tokyo (JP); Makoto Tanaka, Yokohama (JP); Tadakuni Nishio, Yokohama (JP); Ichiro Saito, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/335,353

(22) PCT Filed: Oct. 19, 2016

(86) PCT No.: PCT/JP2016/080932
§ 371 (c)(1),
(2) Date: Mar. 21, 2019

(87) PCT Pub. No.: WO2018/073908
PCT Pub. Date: Apr. 26, 2018

(65) Prior Publication Data
US 2019/0258394 A1    Aug. 22, 2019

(51) Int. Cl.
*G06Q 10/00*    (2012.01)
*G06F 3/0488*    (2013.01)
(Continued)

(52) U.S. Cl.
CPC ......... *G06F 3/04883* (2013.01); *F01D 25/00* (2013.01); *G01N 21/84* (2013.01);
(Continued)

(58) Field of Classification Search
CPC .... G06F 3/04883; G06F 3/0416; F01D 25/00; G01N 21/84; G01N 21/88; G05B 23/0283; G06Q 10/20
See application file for complete search history.

(56) References Cited

U.S. PATENT DOCUMENTS 8,983,172 B2    3/2015    Steffenson
10,360,601 B1 *  7/2019    Adegan ................. G06Q 10/20
(Continued)

FOREIGN PATENT DOCUMENTS

JP    2002-340805    11/2002
JP    2008-292405    12/2008
(Continued)

OTHER PUBLICATIONS

International Search Report dated Jan. 17, 2017 in International (PCT) Application No. PCT/JP2016/080932 with English translation.
(Continued)

*Primary Examiner* — Beau D Spratt
(74) *Attorney, Agent, or Firm* — Wenderoth, Lind & Ponack, L.L.P.

(57) ABSTRACT

An inspection assistance device includes a damage drawing input part configured to input a damage drawing, i.e. a drawing illustrating damages of target parts, a display configured to display the damage drawing and target figures illustrating target parts to be overlaid with each other, and a storage configured to store the damage drawing separately from the target figures in connection with the target figures.

14 Claims, 12 Drawing Sheets

(51) Int. Cl.
  *G01N 21/88* (2006.01)
  *G05B 23/02* (2006.01)
  *G06F 3/041* (2006.01)
  *F01D 25/00* (2006.01)
  *G01N 21/84* (2006.01)

(52) U.S. Cl.
  CPC ......... *G01N 21/88* (2013.01); *G05B 23/0283* (2013.01); *G06F 3/0416* (2013.01); *G06Q 10/20* (2013.01)

(56) References Cited

U.S. PATENT DOCUMENTS

| | | | |
|---|---|---|---|
| 2005/0038817 A1 | 2/2005 | Huang et al. | |
| 2010/0217554 A1* | 8/2010 | Knight | G06Q 10/20 702/84 |
| 2011/0115816 A1* | 5/2011 | Brackney | H05B 47/10 345/629 |
| 2011/0218825 A1* | 9/2011 | Hertenstein | G06Q 40/08 705/4 |
| 2013/0083012 A1* | 4/2013 | Han | G05B 15/02 345/419 |
| 2015/0077435 A1* | 3/2015 | Koga | G06T 19/006 345/633 |
| 2015/0109318 A1* | 4/2015 | Ito | G06Q 10/10 345/589 |
| 2016/0292759 A1* | 10/2016 | Gonzalez Miranda | G06F 3/04847 |

FOREIGN PATENT DOCUMENTS

| | | |
|---|---|---|
| JP | 2009-108849 | 5/2009 |
| JP | 2014-134470 | 7/2014 |
| JP | 2014-149583 | 8/2014 |
| JP | 2014-174891 | 9/2014 |
| JP | 2014-182113 | 9/2014 |
| JP | 2015-78964 | 4/2015 |
| JP | 5822555 | 11/2015 |

OTHER PUBLICATIONS

International Preliminary Report on Patentability dated Sep. 11, 2018 in International (PCT) Application No. PCT/JP2016/080932 with English translation.

* cited by examiner

INSPECTION ASSISTANCE DEVICE, INSPECTION ASSISTANCE METHOD, AND PROGRAM

TECHNICAL FIELD

The present invention relates to an inspection assistance device, an inspection assistance method, and a program.

BACKGROUND ART

Various technologies have been proposed with respect to assistance of inspections for maintenance and checkup of plant facilities. For example, Patent Literature Document 1 discloses an inspection and repair assistance device for producing information to display damaged parts in connection with repair measures. To get a client's approval of repairs, the inspection and repair assistance device produces information and sends it to client terminals.

Patent Literature Document 2 discloses an inspection recording device using a display configured to display information regarding damage conditions and a detector configured to detect an operation applied to the information regarding damage conditions displayed on the display. In addition, a modification part changes a displayed status of the information regarding damage conditions when the detector detects the operation. According to the inspection recording device disclosed by Patent Literature Document 2, it is possible to prevent inspection tasks from failing to confirm inspections.

Patent Literature Document 3 discloses an inspection assistance system for assisting countermeasures in inspection tasks. The inspection assistance device is designed to obtain images of inspected objects from an inspection terminal device, to detect incongruent parts from images, and to thereby determine whether or not countermeasures are required for incongruent parts. Subsequently, the inspection assistance device searches for candidates of countermeasures based on images of incongruent parts requiring countermeasures, thus outputting determination results regarding candidates of repair measures and existence/nonexistence of recommendations to replace incongruent parts, to the inspection terminal device.

Patent Literature Document 4 discloses an inspection assistance device having a display configured to display divided areas, which are produced by dividing the shape of an inspected part, to be overlaid with the shape of an inspected part based on data stored on a storage unit. In addition, an input part receives an input operation of the positional information of an image displayed on the display. According to the inspection assistance device disclosed in Patent Literature Document 4, it is possible for uses to easily grasp positions in an image for displaying the divided areas of the shape of an inspected part, and therefore, it is possible to reduce a user's mistake of judgment due to differences between actual damages and damage information input by users.

Patent Literature Document 5 discloses a repair task assistance device having a damage data acquisition part configured to acquire damage data presenting a correlation between types of damage, targets of damage to be measured, and measurement values with respect to damage. An overall evaluation value calculating part calculates overall evaluation values by entirely evaluating measured values of damages having the same type of damages. Subsequently, a repair policy determination part determines repair policies by comparing overall evaluation values and repair-reference data. According to the repair task assistance device disclosed in Patent Literature Document 5, it is possible to present appropriate policies for repair measures by way of overall evaluation of multiple damage.

CITATION LIST

Patent Literature Document

Patent Literature Document 1: Japanese Patent No. 5822555
Patent Literature Document 2: Japanese Patent Application Publication No. 2015-78964
Patent Literature Document 3: Japanese Patent Application Publication No. 2014-149583
Patent Literature Document 4: Japanese Patent Application Publication No. 2014-182113
Patent Literature Document 5: Japanese Patent Application Publication No. 2014-174891

SUMMARY OF INVENTION

Technical Problem

Occasionally, it may be necessary to control an amount of communications for an inspection assistance device for assisting inspections, which is configured as a mobile terminal device to communicate with a server equipment. By controlling an amount of communications by the inspection assistance device, it is possible to control suppression of communication bands, and therefore it is possible to reduce the processing time and the processing load of an inspection assistance device.

The present invention aims to provide an inspection assistance device configured to control an amount of communications to assist inspections by communicating with a server equipment as well as an inspection assistance method and a program.

Solution to Problem

According to a first aspect of the invention, an inspection assistance device includes a damage drawing input part configured to input damage drawing corresponding to a drawing representing a damage of a target part, a display configured to display the damage drawing and a target figure illustrating the target part to be overlaid with each other, and a storage configured to store the damage drawing separately from the target figure in connection with the target figure.

The inspection assistance device may further include a damage information input part configured to input damage information corresponding to information regarding the damage. The storage stores the damage drawing and the damage information which are correlated with each other with respect to the same damage.

The damage information input part inputs a reference line representing a correlation between the damage drawing and the damage information, wherein the storage stores the damage drawing, the damage information, and the reference line which are correlated with each other with respect to the same damage.

The display may display the reference line with a first end overlaid with the damage drawing, or the display may display the reference line with the first end disposed in proximity to the damage drawing. The display may display the damage information in proximity to a second end of the reference line opposite to the first end.

The display may display the damage drawing in a display manner according to the damage information input to the damage information input part.

The inspection assistance device may further include a repair necessity determination part configured to determine necessity or a degree of repair of the damage indicated by the damage drawing based on the position of the damage drawing and the damage information.

The repair necessity determination part may determine a necessity or a degree of repairing the damage indicated by the damage drawing based on determination standard information representing a relationship between an area of the target figure and a determination standard for determining whether or not to repair the damage in the area, and the position of the damage drawing.

The damage information includes a type of the damage and numerical values representing properties of the damage while the determination standard information is the information describing the relationship between the area of the target figure and the determination standard for determining whether or not to repair the damage in the area with respect to each damage type. The repair necessity determination part may determine a necessity or a degree of repairing the damage based on the area and the determination standard correlated with the type of the damage in the information regarding the area.

The display may display the damage drawing and the area overlaid with the target figure.

The damage drawing and the area can each be represented using a vector figure.

The inspection assistance device may further include a type input part configured to receive the type of the damage drawing input to the damage drawing input part. The type of the damage drawing includes a damage group consisting of a plurality of damage items. The storage may store a single damage drawing to represent a plurality of drawings input to the damage drawing input part when the type of the damage drawing input to the type input part corresponds to the damage group.

The damage drawing may include a representative damage drawing representing damages commonly occurring in multiple target parts of the same type installed in the same device, and an individual damage drawing representing damages occurring in an individual target part among multiple target parts. The display may display the representative damage drawing regarding the multiple target parts and the individual damage drawing regarding the individual target part, which are overlaid with the target figure illustrating the individual target part.

The display may display an image of a displayed object using layers overlaid with each other such that a decision whether or not to display the image is set for each layer. The display may selectively display a displayable layer of the image.

According to a second aspect of the invention, an inspection assistance method includes the steps of: inputting damage drawing corresponding to a drawing representing damage of a target part; displaying the damage drawing and a target figure illustrating the target part, which are overlaid with each other; and storing the damage drawing separately from the target figure in connection with the target figure.

According to a third aspect of the invention, a program causes a computer to implement: inputting a damage drawing corresponding to a drawing representing damage of a target part; displaying the damage drawing and a target figure illustrating the target part, which are overlaid with each other; and storing the damage drawing separately from the target figure in connection with the target figure.

Advantageous Effects of Invention

According to the inspection assistance device, the inspection assistance method, and the program, it is possible to control an amount of communications to assist inspections by communicating with a server equipment.

DESCRIPTION OF EMBODIMENT

The embodiment of the present invention will be described below, wherein the embodiment does not intend to limit the scope of the invention according to claims. In this connection, all the combinations of features described in the embodiment are not necessarily essential to solving means of the invention.

Figure 1:
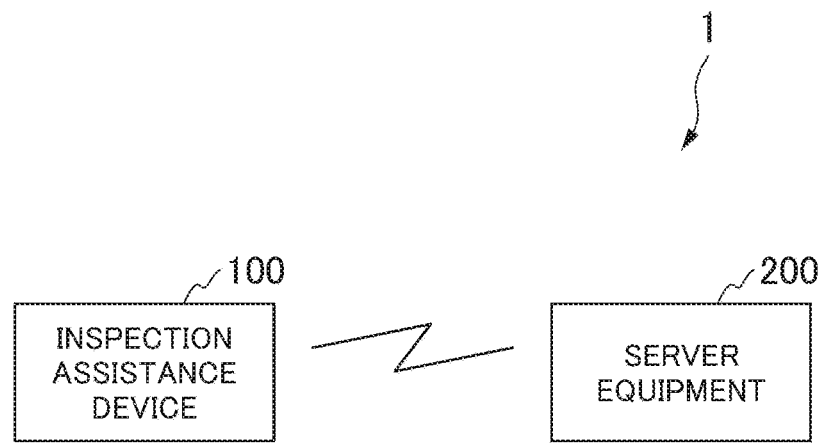
FIG. 1 is a configuration diagram showing a device configuration of an inspection assistance system according to an embodiment of the present invention.

FIG. 1 is a configuration diagram showing a device configuration of an inspection assistance system according to the embodiment of the present invention. As shown in FIG. 1, an inspection assistance system 1 includes an inspection assistance device 100 and a server equipment 200.

The inspection assistance system 1 is a system configured to assist inspections. In particular, the inspection assistance system 1 saves inspection records. The inspection assistance system 1 may not necessarily be limited to particular inspections, but the inspection assistance system 1 needs to produce the inspection records. For example, it is possible to use the inspection assistance system 1 for the purpose of maintenance and inspection of facilities such as power plants.

The inspection assistance device 100 is configured as a mobile terminal device. An operator in charge of inspections needs to carry the inspection assistance device 100 on the way to a work site and to thereby input the inspection records into the inspection assistance device 100.

To assist an input operation of the inspection records, the inspection assistance device 100 displays figures of inspected parts. The operator may input inspection records by writing damages on the displayed figures. Hereinafter, inspected parts will be referred to as target parts.

When the operator completes inputting inspection records, the inspection assistance device 100 transmits the inputted inspection records to the server equipment 200 according to an operation by the operator.

It is possible to achieve the function of the inspection assistance device 100 using a general-purpose mobile computer such as a tablet terminal device executing application programs. Alternatively, it is possible to configure the inspection assistance device 100 using special hardware.

The server equipment 200 saves inspection records transmitted by the inspection assistance device 100. In addition, the server equipment 200 stores information regarding target parts such as figures of target parts in advance. The server equipment 200 provides information regarding target parts to the inspection assistance device 100 upon request.

Figure 2:
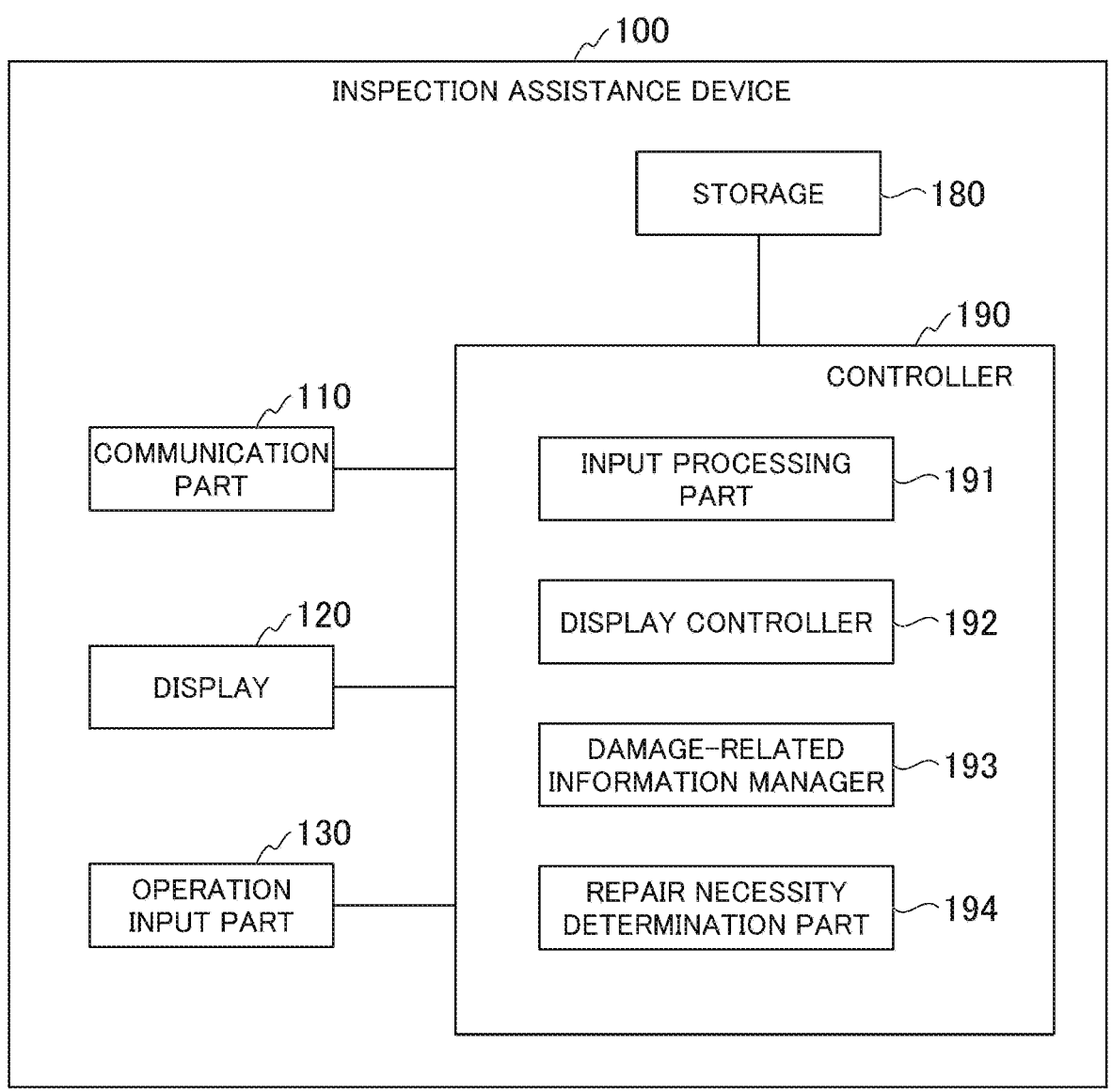
FIG. 2 is a block diagram showing a functional configuration of the inspection assistance device according to the embodiment of the present invention.

FIG. 2 is a block diagram showing the functional configuration of the inspection assistance device 100. As shown in FIG. 2, the inspection assistance device 100 includes a communication part 110, a display 120, an operation input part 130, a storage 180, and a controller 190. The controller 190 further includes an input processing part 191, a display controller 192, a damage-related information manager 193, and a repair necessity determination part 194.

The communication part 110 communicates with the server equipment 200. In particular, the communication part 110 receives information regarding target parts from the server equipment 200 under the control of the controller 190. In addition, the controller 110 transmits inspection records to the server equipment 200 under the control of the controller 190.

For example, the display 120 is equipped with a display screen such as a liquid-crystal panel, which is configured to display various images under the control of the display controller 192. In particular, the display 120 displays figures of target parts such as outline figures. When an operator attempts to write damages of target parts into figures of target parts, the display 120 displays the written damages overlaid with the figures of target parts. Hereinafter, figures of target parts will be referred to as target figures. In addition, images representing damages of target parts will be referred to as a damage drawing.

When an operator inputs damage information in addition to the damage drawing, the display 120 further displays the damage information and reference lines in addition to the target figures and the damage drawing. In particular, an operator is able to input types of damages, sizes of damages, or their combinations.

The above reference lines are line segments representing a relationship between the damage drawing and the damage information. To display the relationship between damage drawing and damage information using the reference lines, the display 120 displays damage information in proximity to one end of each reference line. Another end of each reference line is disposed in proximity to damage drawing or at a position overlaid with damage drawing. For example, the term "proximity" means a range within a distance predetermined using a constant.

The operation input part 130 receives a user operation. As the operation input part 130, it is possible to use various input devices configured to input operations on the display screen of the display 120. For example, the operation input part 130 may include a touch sensor used to form a touch panel attached onto a display screen of the display 120. Alternatively, the operation input part 130 may include a mouse. Alternatively, the operation input part 130 may include a pen-type pointer for indicating a specific position on the display screen of the display 120. Alternatively, the operation input part 130 may include multiple devices among those input devices.

The operation input part 130 may illustrate a damage drawing input part configured to receive an input damage drawing. In addition, the operation input part 130 may illustrate a damage information input part configured to receive input damage information. Moreover, the operation input part 130 may receive an input reference line. For example, the operation input part 130 is configured to input a reference line upon entering a drawing operation using lines in a reference-line input mode.

The operation input part 130 may illustrate a type input part configured to receive an input type of damage drawing. An example of types of damage drawing input to the operation input part 130, it is possible to mention damage groups representing lines, areas (or ranges), and marks. For example, the damage group may include a plurality of damage items such as aggregation of multiple cracks. In this connection, the type of damage drawing representing damage groups will be referred to as damage groups.

The storage 180 is configured using a storage device, installed in the inspection assistance device 100, to store various pieces of information.

The controller 190 carries out various processes by controlling various parts of the inspection assistance device 100. For example, it is possible to achieve the function of the controller 190 using a CPU (Central Processing Unit) installed in the inspection assistance device 100 to read and execute programs on the storage 180.

The input processing part 191 is configured to detect a user operation received by the operation input part 130. In particular, the input processing part 191 identifies a start point and an end point of the reference line according to an input operation of the reference line.

The display controller 192 displays various images by controlling the display 120. In particular, the display controller 192 controls the display 120 to display an arrowhead at the start point of the reference line. In addition, the display controller 192 controls the display 120 to display damage information in proximity to the end point of a reference line.

The display controller 192 displays damage drawing and a determination-standard area based on vector-format image data on the display 120. In this connection, it is possible to reduce the storage capacity to store image data using vector-format image data with the inspection assistance device 100.

The damage-related information manager 193 may serve as an example of a storage configured to store damage drawings separately from target figures in connection with target figures. Herein, the term "record" means an operation to store data on the storage 180.

In particular, the damage-related information manager 193 records damage drawing regarding the same type of damages in connection with damage information and reference lines. In addition, the damage-related information manager 193 records one damage drawing representing multiple drawings input to the operation input part 130 in a damage-group input mode.

The damage-group input mode is a mode for an operator to write damage groups. In other words, the damage-group input mode is a mode for the inspection assistance device 100 to generate damage drawing for each damage group. The damage-related information manager 193 is configured to aggregate and record a plurality of damage items as a single damage group in a damage-group input mode when it records one damage drawing including multiple drawings input to the operation input part 130.

The repair necessity determination part 194 determines a necessity or a degree to repair damages indicated by damage drawing based on a determination standard of repairing damages, which is stored in advance on the storage 180 based on the position (or coordinates) of damage drawing and the damage information. The determination standard of repairs may stipulate the information correlating a reference to determine a necessity of repairs and a degree of necessary repairs depending on the position of each area and the type of damages when a repaired object is divided into determination-standard areas.

For example, an operator inputs the damage information representing depths and lengths of cracks. When the determination standard of repairs depending on the position of damage drawing represents thresholds regarding depths and lengths of cracks, the repair necessity determination part 194 compares depths and lengths of cracks indicated by the damage information with the thresholds of depths and lengths of cracks indicated by the determination standard, thus determining a necessity or a degree of repairs. For example, it is necessary to determine whether to make repairs such as a blending of wing surfaces when the depth of cracks is less than 2 mm while the length of cracks is less than 2 mm; it is necessary to determine whether to carry out cutting and build-up welding on wing surfaces when the depth of cracks is more than 2 mm and less than 4 mm while the length of cracks is more than 2 mm and less than 10 mm; and it is necessary to determine whether to abandon wings when the depth of cracks is more than 4 mm while the length of cracks is more than 100 mm.

Since the repair necessity determination part 194 is configured to determine a necessity or a degree of repairs, the repair necessity determination part 194 may refer to determination results as a criterion of determining a necessity or a degree of repairs.

The repair necessity determination part 194 is configured to determine a necessity or a degree of repairing damages indicated in the damage drawing, based on the position of damage drawing with reference to the determination standard information representing the relationship between the areas of damage figures and the criterion of determining a necessity of repairing damages in those areas.

Accordingly, it is possible for the repair necessity determination part 194 to determine a necessity of repairs with high precision irrespective of different criteria of determining a necessity of repairs for each determination-standard area.

Next, a display process of the display 120 and the processing of the inspection assistance device 100 will be described with reference to FIGS. 3 to 12.

Figure 3:
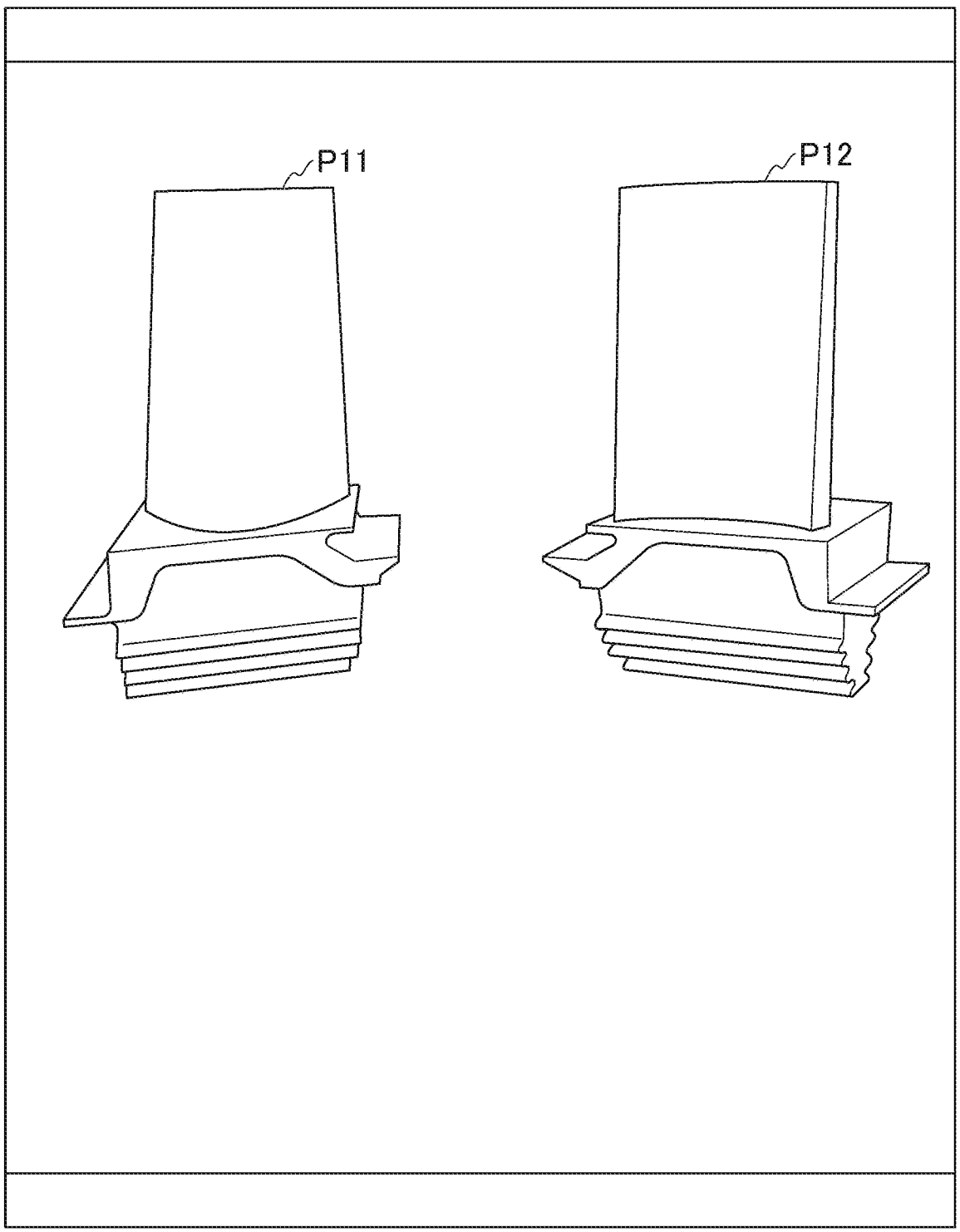
FIG. 3 shows examples of target figures according to the embodiment of the present invention.

FIG. 3 shows an example of target figures. In FIG. 3, the display 120 shows images P11 and P12. The images P11 and P12 are images of two outline figures observing a target part in different directions, which may correspond to an example of target figures.

As shown in FIG. 3, the display 120 may display multiple target figures. The display 120 may display multiple target figures representing a single target part, or the display 120 may display target figures representing multiple target parts. Alternatively, the display 120 may display a single target figure.

The display 120 is configured to display target figures, which are not necessarily limited to a specific type of figures. For example, the display 120 may display target figures as outline figures of target parts in a bird's eye view. Alternatively, the display 120 may display target figures as outline figures of target parts in a front view, a plane view, or a side view. Alternatively, the display 120 may display target figures of target parts in a cross-sectional view.

The communication part 110 may receive target-figure data from the server equipment 200. Alternatively, the storage 180 may store target-figure data in advance.

Figure 4:
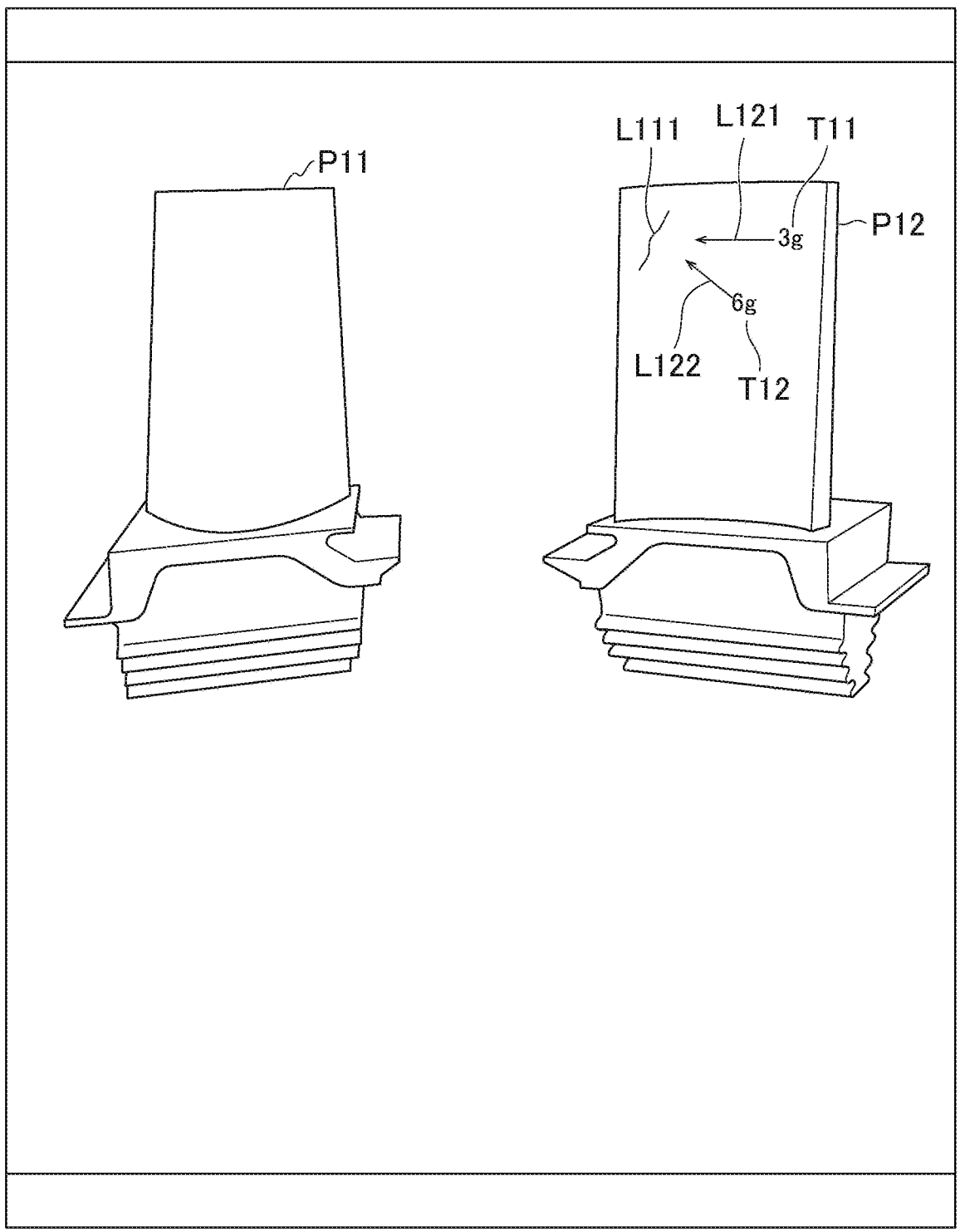
FIG. 4 shows examples of target figures, damage drawings, damage information, and reference lines.

FIG. 4 shows an example of target figures, a damage drawing, damage information, and reference lines. In FIG. 4, the display 120 displays images P11 and P12, lines L111, L121, and L122, and character strings T11 and T12.

Herein, the images P11 and P12 are identical to those shown in FIG. 3, and therefore they are denoted using the same reference signs shown in FIG. 3.

The line L111 may illustrate a trace of a damage drawing corresponding to a crack. The display 120 displays the line L111 overlaid with the image P12 to depict the position of a crack.

The display 120 is not necessarily limited to display marks of damage drawings but may display ranges, marks, or their combinations. In the case of peelings of paint or planar damages such as scratches, for example, the display 120 may show a range of damage drawing by filling a damaged area with paint. Alternatively, the display 120 may display marks representing predetermined types of damages by displaying "x" as a hole clog.

The character strings T11 and T12 are examples of damage information. In FIG. 4, the display 120 may display multiple pieces of damage information with respect to a single damage drawing. When cracks have different widths or depths at different positions, for example, an operator should input damage information for each position. In this case, the display 120 may display the input damage information for each position.

The lines L121 and L122 are examples of reference lines. The line L121 shows a relationship between the line L111, which is an example of damage drawing, and the character string T11, which is an example of damage information. The line L121 is depicted as an arrow with an arrowhead disposed in proximity to the line L111. The character string T11 is displayed in proximity to another end of the line L121 opposite to the arrowhead of line L121. Accordingly, the line L121 shows a correlation between the character string T11 and the line L111.

Similarly, the line L122 shows a relationship between the line L111, which is an example of damage drawing, and the character string T12, which is an example of damage information. The line L122 is depicted as an arrow with an arrowhead disposed in proximity to the line L111. The character string T12 is displayed in proximity to another end of the line L122 opposite to the arrowhead of line L122. Accordingly, the line L122 shows a correlation between the character string T12 and the line L111.

As described above, the inspection assistance device 100 can be used to describe two symbols such as an arrow (i.e. a reference line) and a character string (i.e. damage information) or to exchange one symbol with another symbol with respect to the line L111 serving as an example of damage drawing. In FIG. 4, for example, it is possible to positionally exchange an arrowhead of a reference line depicted as the line L121 with an arrowhead of a reference line depicted as the line L121. According to an exchange of lines, it is possible to reversely interchange parts of damage drawing (i.e. the line L111), i.e. a part of damage drawing correlated with the character string T11 of the damage information and another part of damage drawing correlated with the character string T12 of the damage information.

The damage-related information manager 193 may record damage drawing in connection with target figures, and therefore, as shown in FIG. 4, the display 120 may display damage drawing overlaid with target figures. It is possible to indicate the position of damages of target parts since the display 120 displays damage drawing overlaid with target figures.

The damage-related information manager 193 may record damage drawing and target figures separately, and therefore it is unnecessary to transmit target-figure data when the communication part 110 transmits damage-related information to the server equipment 200. For example, it is unnecessary to transmit target-figure data together with damage-drawing data when the communication part 110 transmits damage-drawing data as inspection records to the server equipment 200.

Accordingly, it is possible to suppress an amount of communications with the communication part 110 because it is unnecessary for the communication part 110 to transmit target-figure data to the server equipment 200.

In addition, the damage-related information manager 193 may record damage drawing and damage information correlated with each other with respect to the same damage, and therefore, as shown in FIG. 4, the display 120 may display a correlation between damage drawing and damage information on the same screen. That is, the display 120 may display damage drawing and damage information on the same screen, and therefore, an operator may refer to damage information without a necessity of carrying out a display-change operation on the condition that the display 120 is currently displaying damage drawing on the screen.

Moreover, the damage-related information manager 193 may record damage drawing and damage information, and reference lines correlated with each other with respect to the same damage, and therefore the display 120 may display a correlation between damage drawing, damage information, and reference lines on the same screen.

Specifically, as shown in FIG. 4, the display 120 may display a reference line with a first end (e.g. an arrowhead) to be overlaid with a damage drawing, or the display 120 may display a reference line with a first end disposed in proximity to a damage drawing. Subsequently, the display 120 may display damage information in proximity to a second end (e.g. an end opposite to an arrowhead) of a reference line opposite to the first end. Accordingly, the display 120 is able to show a relationship between a damage drawing and a manner of damage using reference lines.

Figure 5:
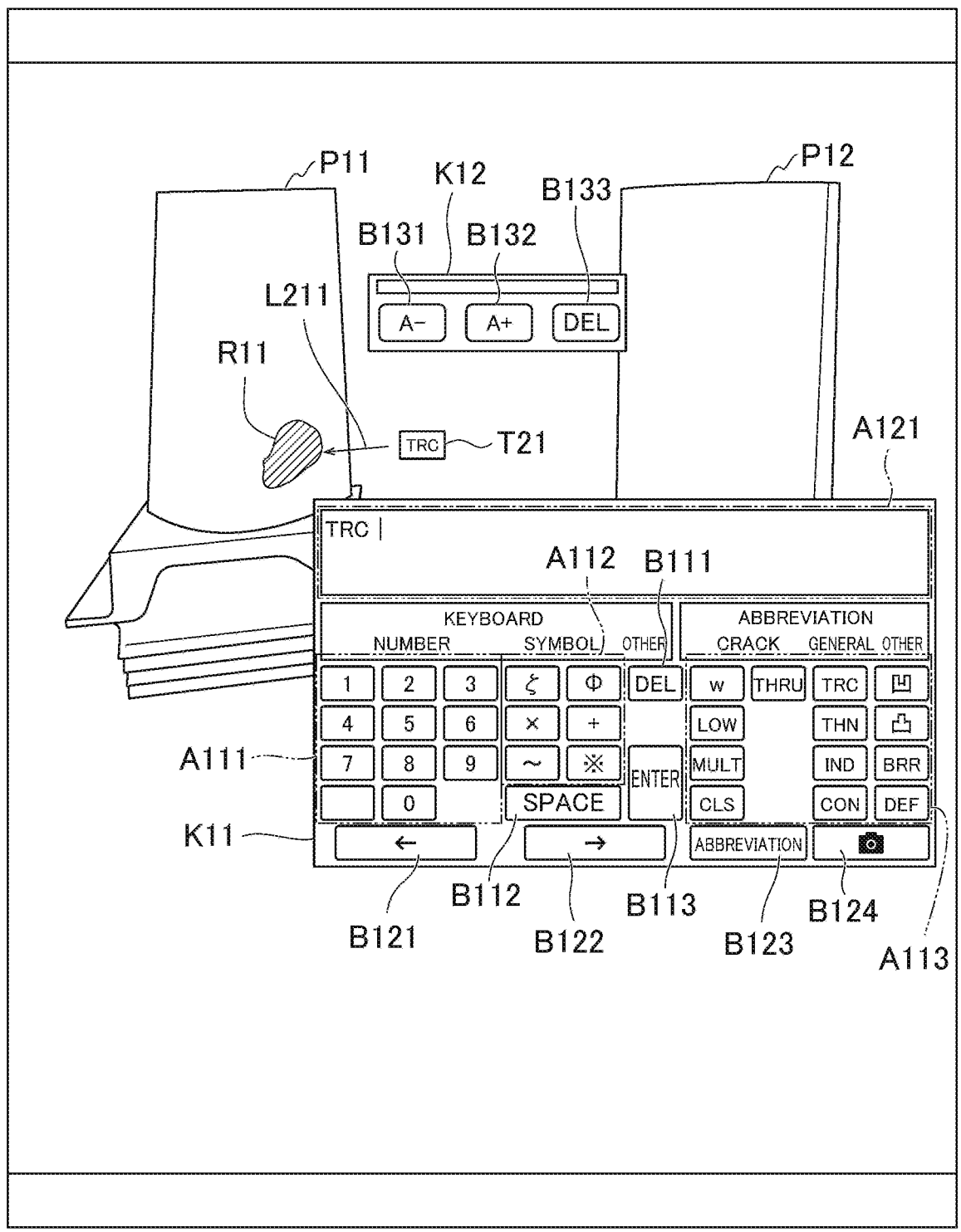
FIG. 5 shows an example of a screen for inputting damage information according to the embodiment of the present invention.

FIG. 5 shows an example of an input screen for inputting damage information. In FIG. 5, the display 120 displays images P11 and P12, a range R11, a line L211, a character string T21, and software keyboards (i.e. screen keyboards) K11 and K12.

Herein, the images P11 and P12 are identical to those shown in FIG. 3, and therefore the images P11 and P12 are denoted using the same reference signs shown in FIG. 3.

The range R11 is an example of damage drawing representing scratches. The display 120 displays the range R11 overlaid with a target figure of the image P11, thus indicating the position of the scratches in a target part.

The character string T21 is an example of damage information. The character string T21 is a predetermined string, i.e. an abbreviation representative of scratches. The display 120 displays the character string T21 as damage information to indicate a damage type, which makes it possible to display hatchings depending on types of damages.

The line L211 is an example of a reference line. The display 120 shows the line L211 to thereby indicate a correlation between the character string T21 and the range R11.

The software keyboard K11 is a keyboard used by an operation to input character strings. An operator may input characters upon touching buttons displayed in the keyboard K11.

Numerical keys are aligned in an area A111 of the software keyboard K11. An operator may press numerical keys to input numerical values representing various types of properties regarding damages such as widths and depths of cracks.

Input buttons having predetermined symbols are aligned in an area A112. An operator may input symbols using those buttons, which may help reduce the number of input characters. In this sense, it is possible to reduce a burden of a load on an operator.

Input buttons having predetermined abbreviations for types of damages are aligned in an area A113. An operator may input types of damages using those buttons in the area A113.

In addition, the display 120 displays damage drawing in a display manner depending on types of damage input by an operator. In FIG. 5, a display manner using slanted hatching is assigned to scratches. Therefore, the display 120 displays the range R11 using the slanted hatching when an operator inputs the character string T21 representing scratches.

Accordingly, the display 120 may display damage drawing in a display manner according to damage information input by an operator. Thus, it is unnecessary for an operator to carry out a manual operation to designate a display manner of damage drawing. In this sense, it is possible to reduce a burden of a load on an operator.

The software keyboard K11 further includes buttons B111, B112, B113, B121, B122, B123, and B124.

The button B111 is a delete key. The button B112 is a space key. The button B113 is a return key.

The buttons B121 and B122 are cursor keys. A cursor may move leftwards upon a user touching the button B121 while a cursor may move rightwards upon a user touching the button B122.

The button B123 is a mode switch button of the software keyboard K11. The software keyboard K11 has a numerical mode and an abbreviation mode. The numerical mode is used to input numerical values representing various characters regarding damages such as widths and depths of cracks. FIG. 5 shows the numerical mode of the software keyboard K11. The abbreviation mode is used to input abbreviations. In the abbreviation mode, the software keyboard K11 may displays a larger number of input buttons for abbreviations than that for the numerical mode. It is possible to switch the mode of the software keyboard K11 every time an operator makes a touch operation on the button B123.

The button B124 is used to capture an image using a camera installed in the inspection assistance device 100.

An area A121 is a display area for displaying character strings being input by an operator. FIG. 5 shows that an operator is currently inputting the character string T21, which is therefore displayed in the area A121.

When an operator makes a touch operation on the area A121, the display 120 displays a normal keyboard for inputting characters.

The software keyboard K12 includes buttons B131, B132, and B133. The button B131 is used to reduce a character size. The button B132 is used to enlarge a character size. An operator may adjust sizes of characters representing damage information to a display space of damage information using the buttons B131 and B132. The button B133 is used to delete character strings.

The display 120 is configured to display determination-standard areas and damage drawings to be overlaid with target figures. Herein, the determination-standard area is an area adopting the same determination standard when making decisions regarding repairs such as a necessity or a degree of repairing damages or a repair method. A determination-standard area is set to each type of damages while a determination standard is set to each determination-standard area.

Figure 6:
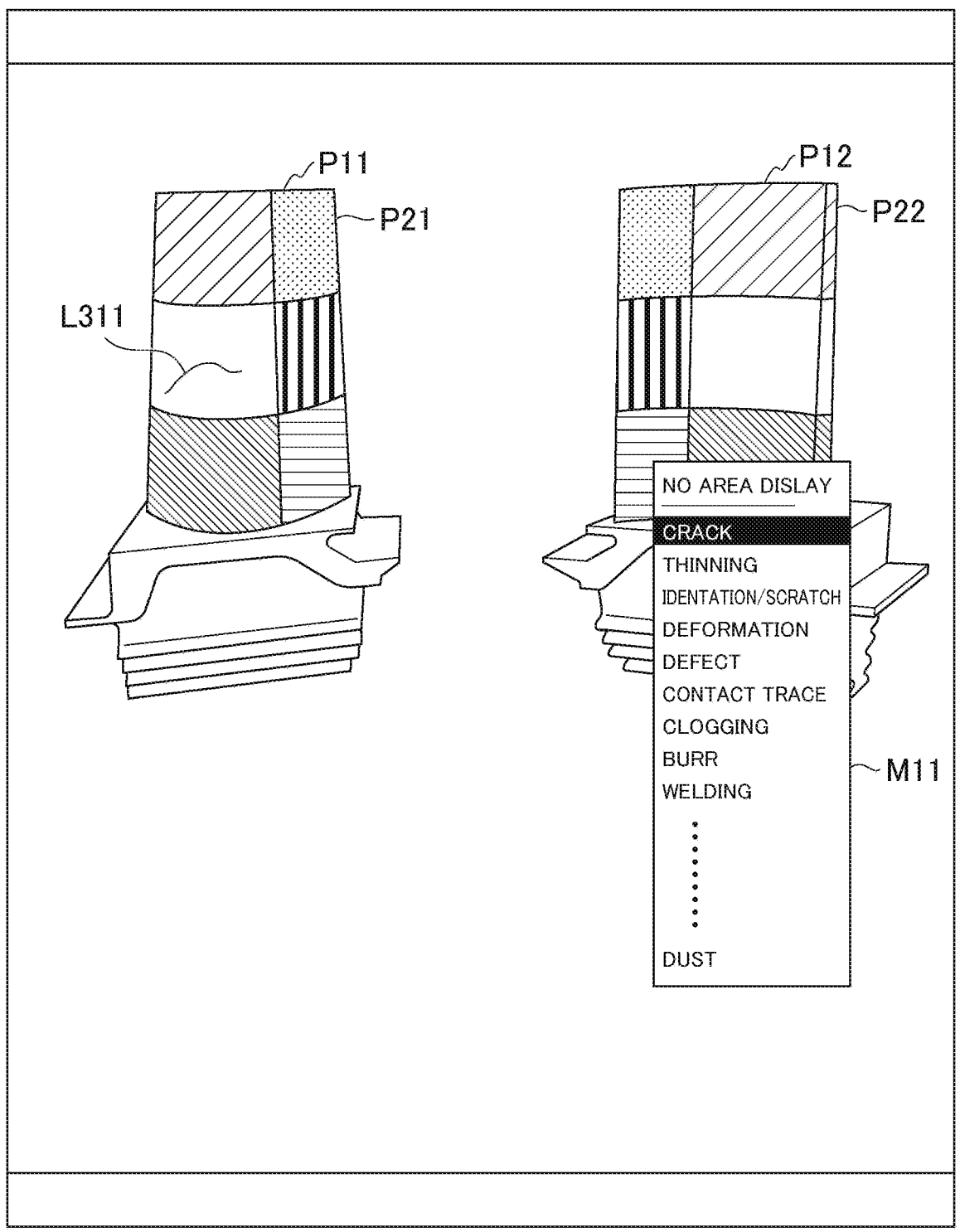
FIG. 6 shows an example of a determination-standard area according to the embodiment of the present invention.

FIG. 6 shows an example of a determination-standard area. In FIG. 6, the display 120 displays images P11, P12, P21, and P22, a line L311, and a menu window M11.

The images P11 and P12 are identical to those shown in FIG. 3, which are denoted using the same reference signs shown in FIG. 3.

The images P21 and P22 are images of figures representing their determination-standard areas, in particular, boundaries of determination-standard areas.

The display 120 displays the images P11 and P21 overlaid with each other, thus showing figures partitioning determination-standard areas in the shape of a target part. Similarly, the display 120 displays the images P21 and P22 overlaid with each other, thus showing figures partitioned into determination-standard areas in the shape of a target part.

In FIG. 6, the display 120 shows determination-standard areas by filling determination-standard areas with different figures; but this is not a limitation to a method of displaying determination-standard areas. For example, the display 120 may display target figures overlaid with the boundaries of determination-standard areas.

The menu window M11 is displayed as a pull-down menu describing types of damages. When an operator selects any one of types of damage described in the menu window M11, the display 120 displays a determination-standard area preset to the selected type of damage.

The line L311 is an example of damage drawing, indicating a crack.

An operator may not be aware of a determination-standard area which is not displayed to be overlaid with a target figure, which may cause a possibility of writing damage to a position slightly shifted from an actual position of the damage. Therefore, a damage decision should be made at a position different from an actual position of a damage, thus reducing a precision of determining the damage.

In contrast, the display 120 is configured to display the damage drawing and the determination-standard area to be overlaid with the target figure, which makes it possible for an operation to confirm the position of damage drawing. When an operator grasps a determination-standard area including an actual damage, an operator is able to write damage into an appropriate determination-standard area with reference to the determination-standard area displayed on the display 120. When the display 120 displays damage drawing overlaid with a determination-standard area, an operator is able to confirm whether or not a damage may be written into an appropriate determination-standard area. If a damage is not written into an appropriate determination-standard area, an operator may delete the damage drawing to thereby rewrite a damage into an appropriate determination-standard area.

Since an operator draws a damage in an appropriate determination-standard area, it is possible for the repair necessity determination part 194 to determine a necessity or a degree of repairs using an appropriate determination standard. In this sense, it is possible for the repair necessity determination part 194 to determine the necessity or a degree of repairs with high precision.

In addition, the repair necessity determination part 194 is configured to determine a necessity or a degree of repairing damages based on a determination standard and an area correlated with a type of damage indicated by damage information.

Accordingly, the repair necessity determination part 194 is able to make a decision with high precision depending on different determination-standard areas for different damage types.

Since the display 120 may display a determination-standard area for each damage type overlaid with a target figure, it is possible to display a target figure including the shape of a target part partitioned into determination-standard areas. Since the shape of a target part is partitioned into determination-standard areas depending on damage types, it is possible for an operator to draw a damage in an appropriate determination-standard area. Since an operator may draw a damage in an appropriate determination-standard area, the repair necessity determination part 194 is able to determine a necessity or a degree of repairs using an appropriate determination standard. In this sense, the repair necessity determination part 194 is able to determine a necessity or a degree of repairs with high precision.

In addition, the display 120 is configured to display representative damage drawing and individual damage drawing overlaid with each other. Herein, the representative damage drawing is an image of damage commonly shared by multiple target parts. That is, the representative damage drawing is a damage drawing representing damage that commonly occurs in multiple target parts of the same type, which are installed in the same device. On the other hand, the individual damage drawing is an image of damage for a single target part. Hereinafter, multiple target parts will be each referred to as an individual target part. The individual damage drawing is a damage drawing showing damage that occurs individually in each individual target part.

When multiple parts of the same type such as turbine wings are subjected to inspection, for example, similar damages may occur at similar positions of multiple parts. If a single input operation may be required to input damage information and to draw similar damages in multiple parts, it is possible to reduce a burden of a load on an operator.

For this reason, the inspection assistance device 100 provides a representative recording mode. The representative recording mode allows an operator to draw common damage with respect to multiple target parts. That is, the representative recording mode causes the inspection assistance device 100 to produce representative damage drawing.

Since the display 120 may display representative damage drawing and individual damage drawing overlaid with each other, it is possible to share a single representative damage drawing among multiple target parts. This may eliminate a necessity for an operator to repeatedly write representative damage drawing; hence, it is possible to reduce a burden of a load on an operator. In addition, it is unnecessary for the inspection assistance device 100 to repeatedly store representative damage drawing data for each target part. In this sense, it is possible to reduce a storage capacity which is required to store damage drawing data in the inspection assistance device 100.

Figure 7:
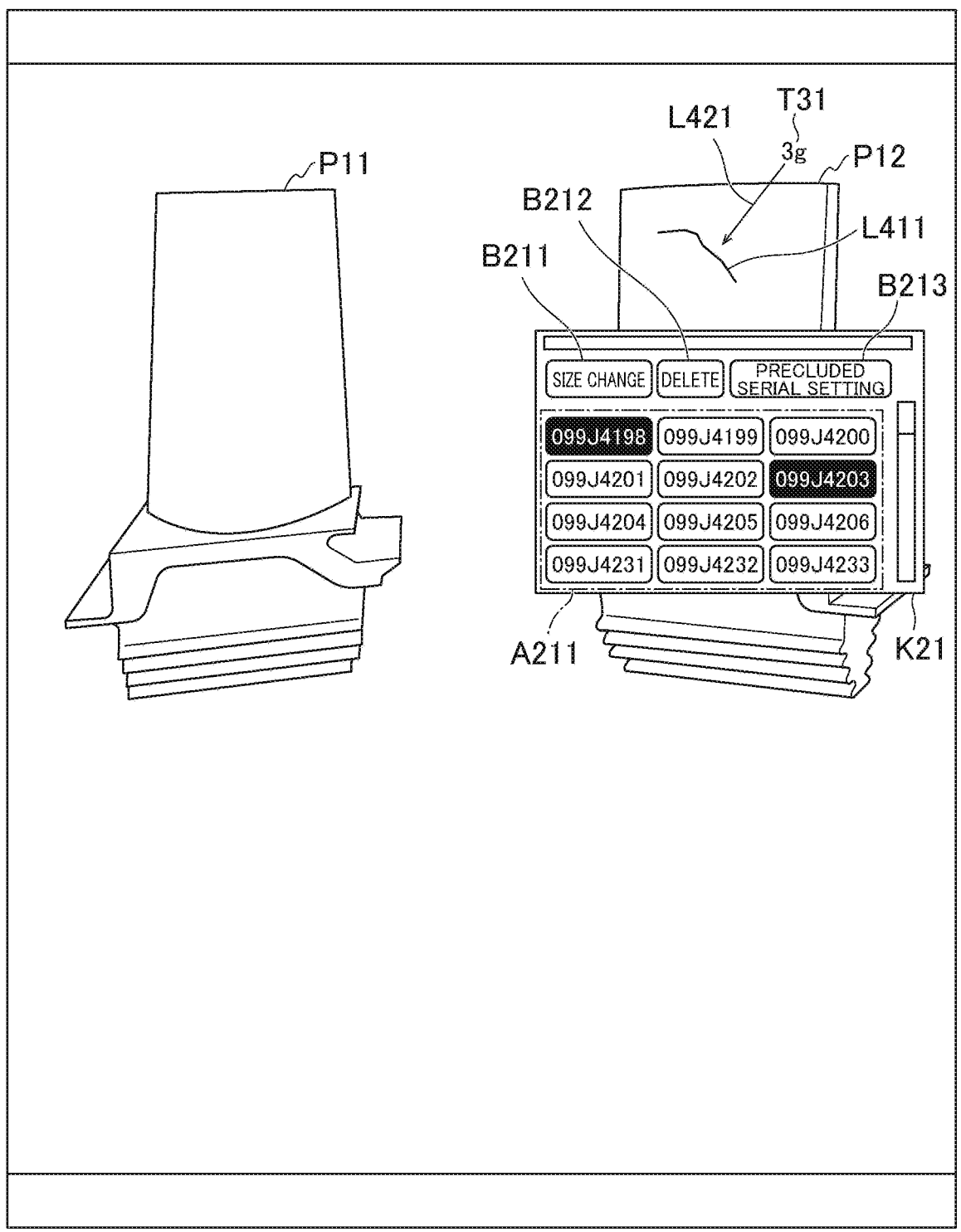
FIG. 7 shows an example of a screen for setting a target part serving as a representative damage drawing according to the embodiment of the present invention.

FIG. 7 shows an example of a setting screen for target parts subjected to representative damage drawing. In FIG. 7, the display 120 displays images P11 and P12, lines L411 and L421, a character string T31, and a software keyboard K21.

The images P11 and P21 are identical to those shown in FIG. 3, and therefor they are denoted using the same reference signs shown in FIG. 3.

The line L411 illustrates a crack as an example of representative damage drawing. The character string T31 is an example of damage information indicating the information regarding a damage depicted by the line L411. Hereinafter, the damage information correlated with the representative damage drawing will be referred to as representative damage information. The line L421 is an example of a reference line, indicating a correlation between the character string T31 and the line L411.

The software keyboard K21 is a keyboard configured to set target parts serving as a representative damage drawing. Buttons having serial numbers used for identifying individual target parts are displayed in an area A211 of the software keyboard K21. An operator may select individual target parts by touching buttons displayed in the area A211.

In addition, the software keyboard K21 includes buttons B211, B212, and B213.

The button B211 is used to change the size of representative damage drawing. The button B212 is used to delete the representative damage drawing. The button B213 is used to enter the setting of individual target parts to be precluded from the displayed objects of representative damage drawing. In a default setting, all the individual target parts are selected as displayed objects of representative damage drawing, and therefore an operator may select serial numbers of individual target parts, which should be precluded from the displayed objects of representative damage drawing, in the area A211. Upon completion of selecting serial numbers in the area A211, an operator may enter the selected serial numbers by touching the button B213.

Figure 8:
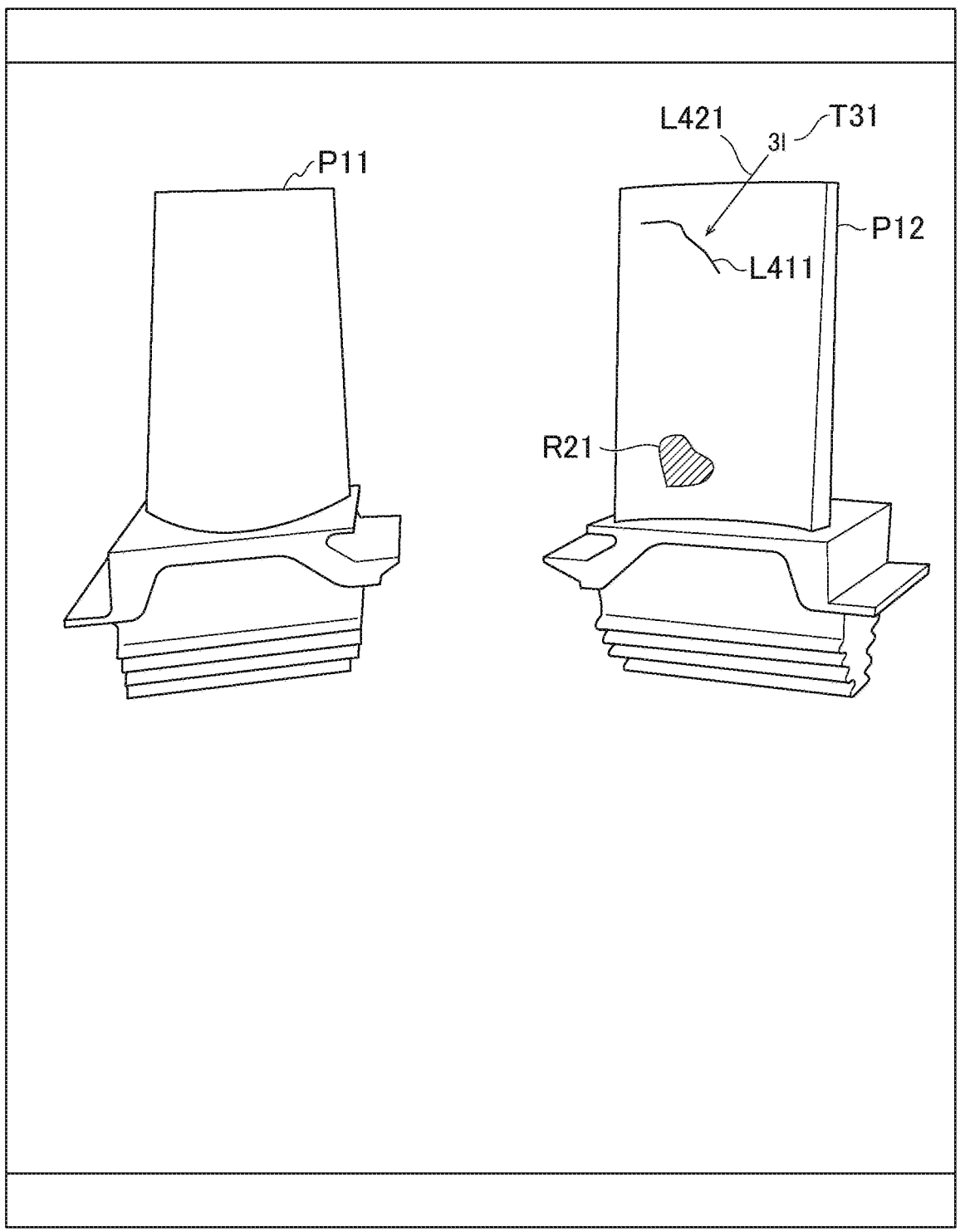
FIG. 8 shows a first example of an individual damage drawing and a representative damage drawing to be overlaid with each other according to the embodiment of the present invention.

FIG. 8 shows a first example of the representative damage drawing and the individual damage drawing to be overlaid with each other. In FIG. 8, the display 120 displays images P11, P12, lines L411, L421, a character string T31, and a range R21.

The images P11 and P12 are identical to those shown in FIG. 3, and therefore they are denoted using the same reference signs shown in FIG. 3. The lines L411, L421 and the character string T31 are identical to those shown in FIG. 7, and therefore they are denoted using the same reference signs shown in FIG. 7.

Figure 9:
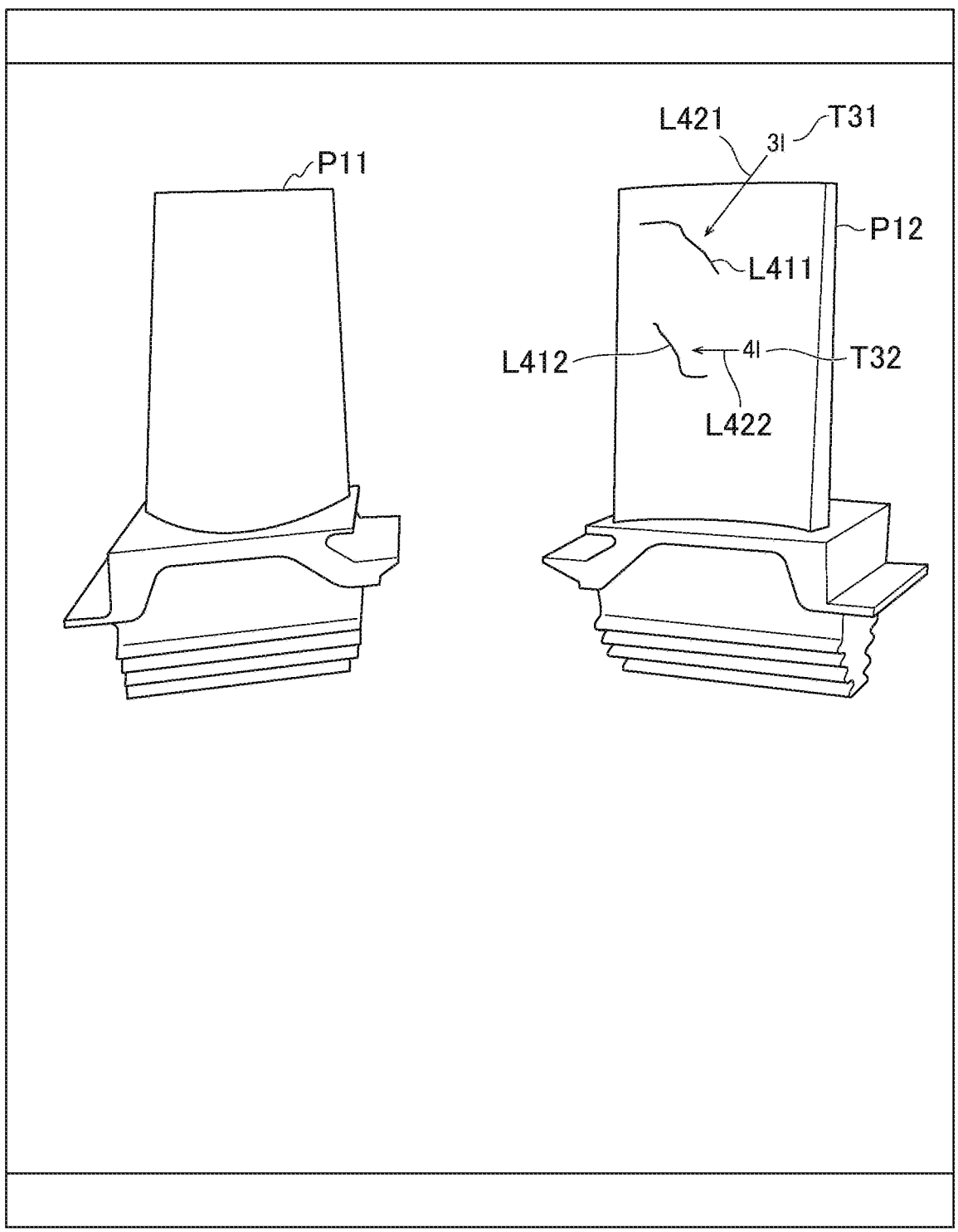
FIG. 9 shows a second example of an individual damage drawing and a representative damage drawing to be overlaid with each other according to the embodiment of the present invention.

FIG. 9 shows a second example of a representative damage drawing and an individual damage drawing to be overlaid with each other. In FIG. 9, the display 120 displays damage drawings of individual target parts different than those shown in FIG. 8. In FIG. 9, the display 120 displays images P11 and P12, lines L411, L412, L421, and L422, and character strings T31 and T32.

The images P11 and P21 are identical to those shown in FIG. 3, and therefore they are denoted using the same reference signs shown in FIG. 3. The lines L411 and L421 and the character string T31 are identical to those shown in FIG. 7, and therefore they are denoted using the same reference signs shown in FIG. 7.

The line L21 is an example of individual damage drawing illustrating a crack. The character string T32 is an example of damage information corresponding to the information of a damage indicated by the line L12. Hereinafter, the damage information correlated with the individual damage drawing will be referred to as individual damage information. The line L422 is an example of a reference line indicating a correlation between the character string T32 and the line L412.

FIGS. 8 and 9 show the line L411, i.e. an example of representative damage drawing, with respect to displayed images of different individual target parts. That is, the display 120 displays target figures, representative damage drawings commonly shared by individual target parts, and individual damage drawings for each individual target part, which are overlaid with each other. Accordingly, as described above, an operator does not need to repeat writing representative damage drawing; hence, it is possible to reduce a burden of a load on an operator. In addition, the inspection assistance device 100 does not need to repeatedly store representative damage drawing data for each target part. In this sense, it is possible to reduce a storage capacity required to store damage drawing data in the inspection assistance device 100.

The display 120 shows an image of a displayed object using layers overlaid with each other, wherein it is possible to make a setting as to whether or not to display an object for each layer. Accordingly, the display 120 may selectively display damage drawing in each displayable layer.

For example, an operator may determine whether or not to display each determination-standard area, which is described above with reference to FIG. 6. According to the setting as to whether or not to display each determination-standard area, the display part 120 may switch a setting as to whether or not to display each determination-standard area.

In the above, it is possible to describe damage drawing and damage information in different layers, whereby an operator may temporarily set a non-display mode for damage drawing or damage information. Due to a difficulty for an operator to visually discriminate damage drawing and damage information overlaid with each other, the display device 120 may temporarily set a non-display mode for damage information, thus making it easy for an operator to observe damage drawing. Due to a difficulty for an operator to visually discriminate damage drawing and damage information overlaid with each other, the display device 120 may temporarily set a non-display mode for damage drawing, thus making it easy for an operator to observe damage information.

In addition, it is possible to input or display damage drawing more easily by enlarging or reducing a target figure as necessary.

Figure 10:
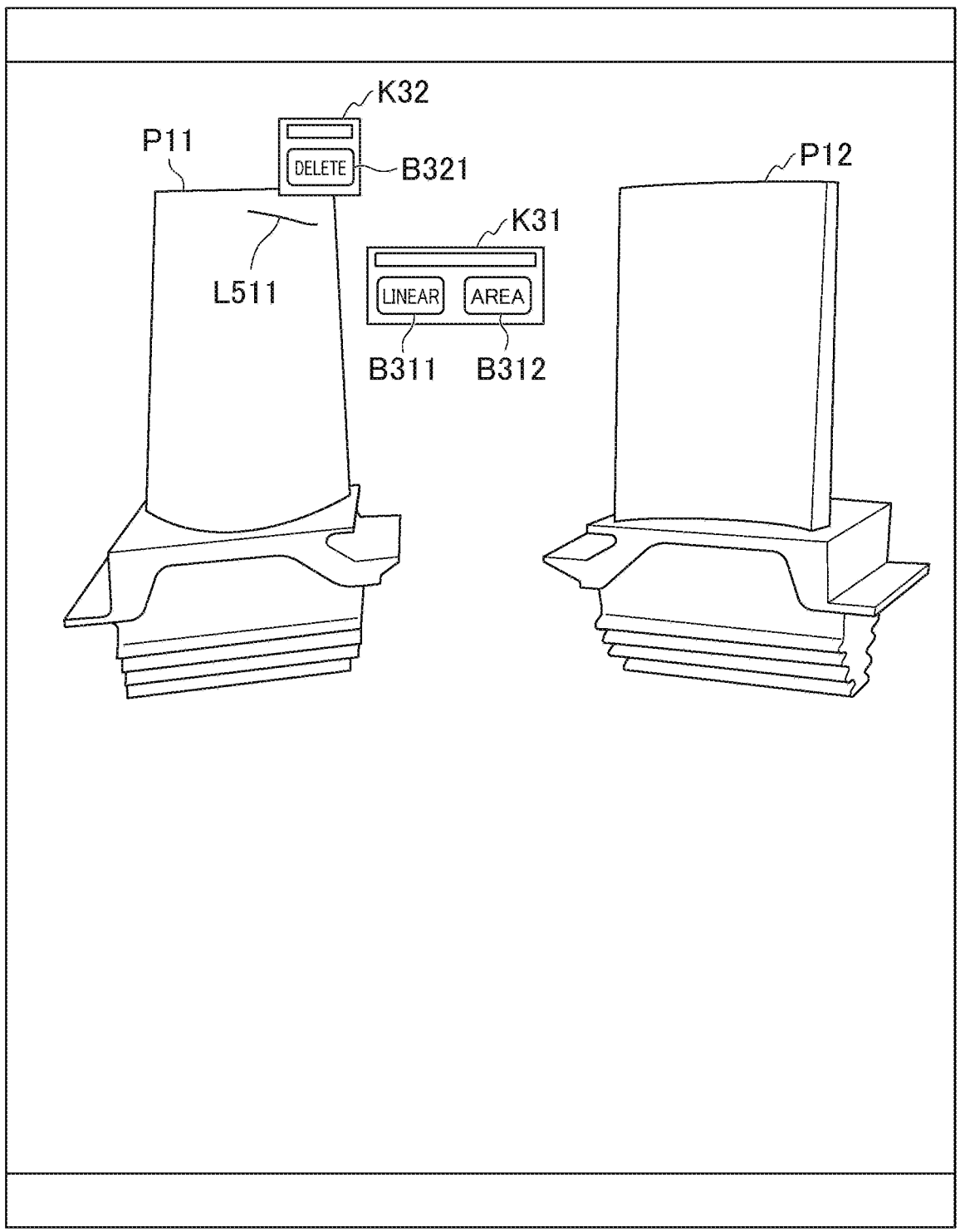
FIG. 10 shows an example of writing a first damage item in a damage-group input mode according to the embodiment of the present invention.

FIG. 10 shows an example of writing a first damage in a damage-group input mode. Upon inputting a damage group designated as a damage type of damage drawing, the inspection assistance device 100 achieves the transition to the damage-group input mode.

In FIG. 10, the display 120 displays images P11, P12, a line L511, and software keyboards K31, K32.

The images P11 and P12 are identical to those shown in FIG. 3, and therefore they are denoted using the same reference signs.

The software keyboard K31 is used to input types of individual damage drawings forming a damage group of damage drawing. The software keyboard K31 includes buttons B311 and B312. The button B311 is used to designate types of damage drawing. The button B312 is used to designate areas (or ranges) as types of damage drawing. An operator needs to select a type of damage drawing when writing a first damage in a damage-group input mode. The same type of damage drawing set to the first damage will be set when writing a second damage item or its subsequent damage items.

The software keyboard K32 is used to delete the written damage. The software keyboard K32 includes the button B321 used to delete the written damage.

Figure 11:
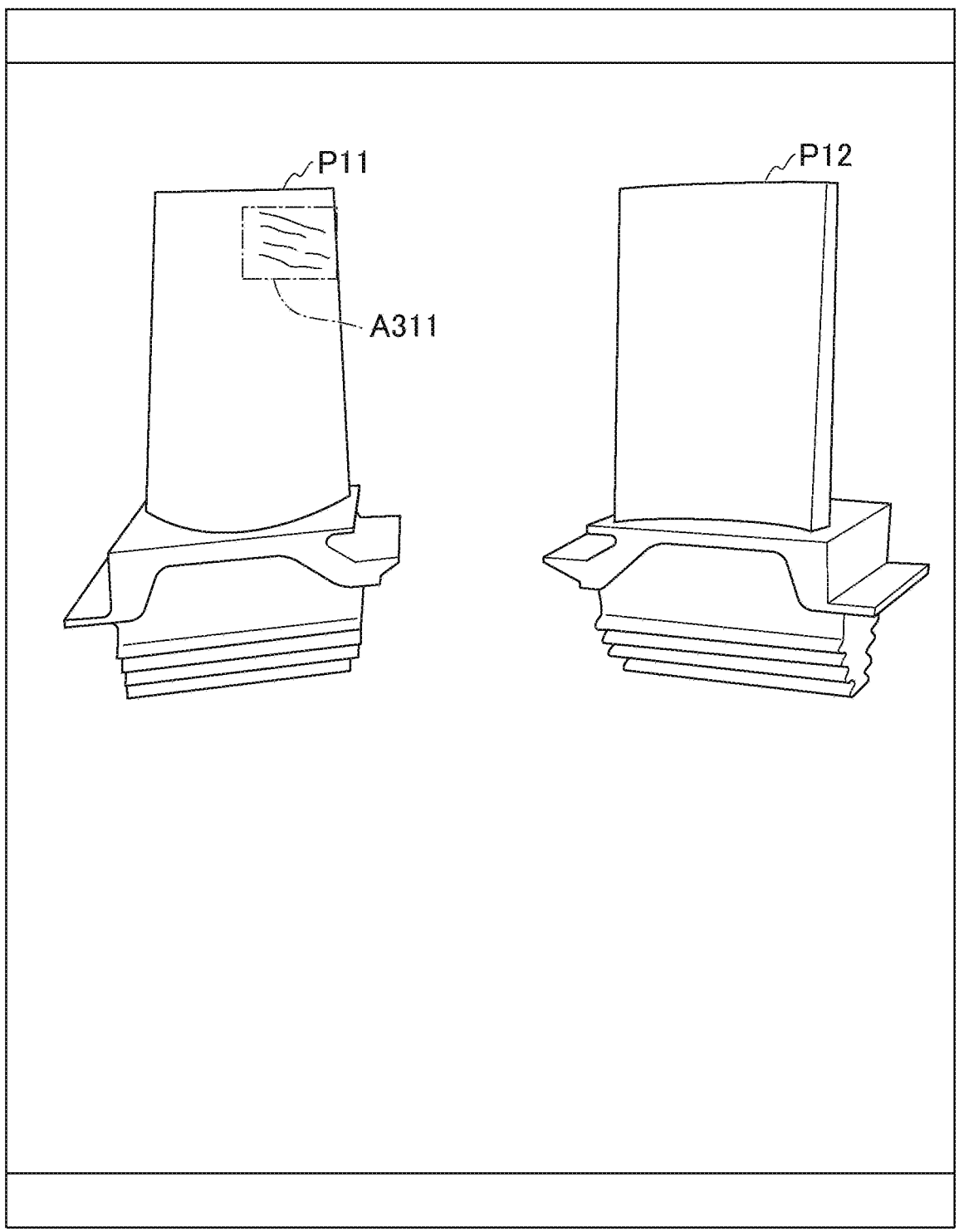
FIG. 11 shows an example of writing a subsequent damage item following a first damage item in a damage-group input mode according to the embodiment of the present invention.

FIG. 11 shows an example of writing subsequent damages, following the first damage, in the damage-group input mode. In FIG. 11, the display 120 displays images P11 and P12 as well as multiple traces written in the area A311.

The images P11 and P12 are identical to those shown in FIG. 3, and therefore they are denoted using the same reference signs shown in FIG. 3.

A plurality of traces are written into the area A311 in the damage-group input mode. The inspection assistance device 100 generates a damage group of damage drawing by aggregating multiple traces written in the damage-group input mode.

Figure 12:
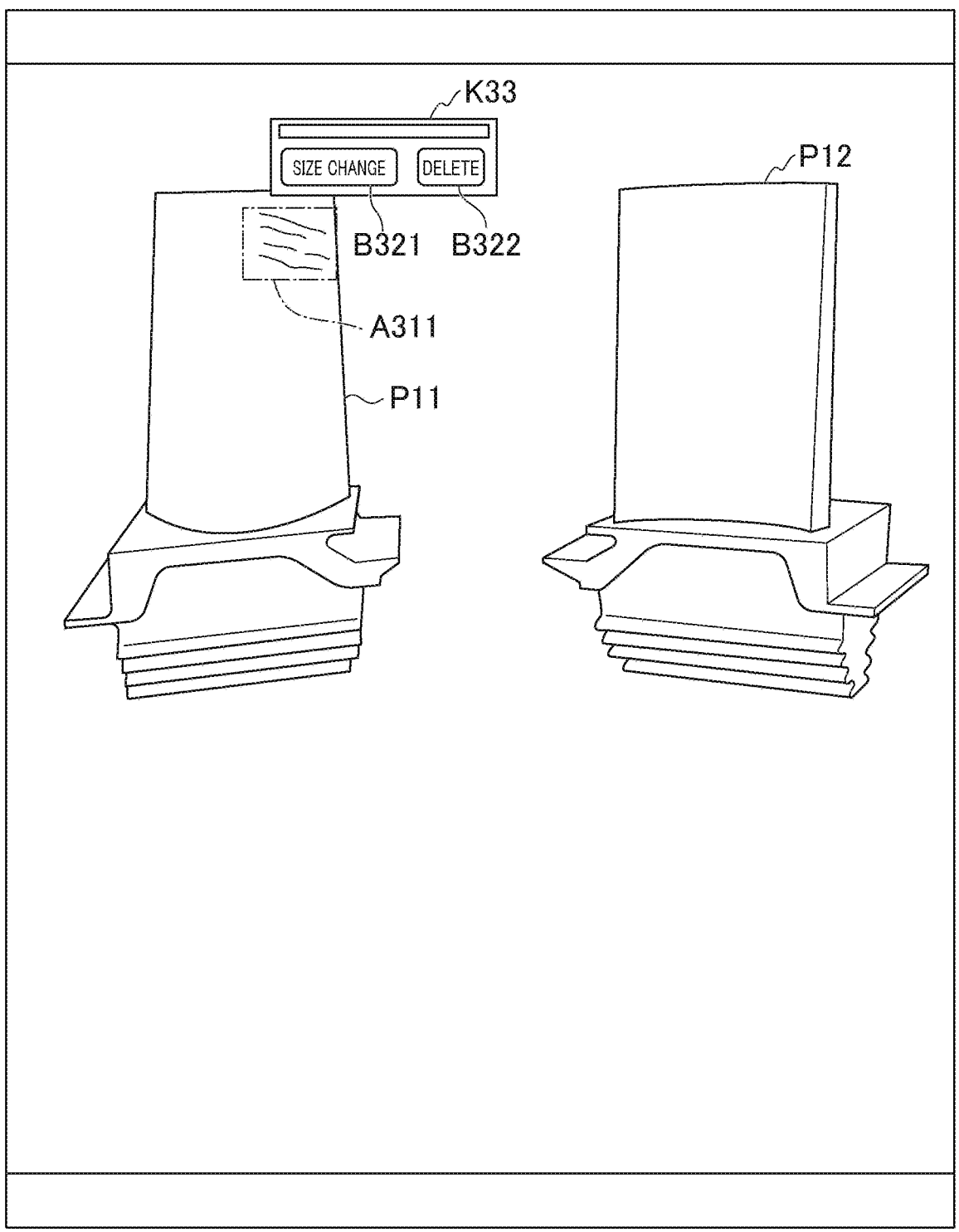
FIG. 12 shows an example of completion of writing damages in a damage-group input mode according to the embodiment of the present invention.

FIG. 12 shows an example of completion of writing damages in the damage-group input mode. In FIG. 12, the display 120 displays images P11 and P12, multiple traces written in the area A311, and a software keyboard K33.

The images P11 and P12 are identical to those shown in FIG. 3, and therefore they are denoted using the same reference signs shown in FIG. 3. The area A311 is identical to that of FIG. 11 and denoted using the same reference sign shown in FIG. 11.

The software keyboard K33 is used to manipulate a damage group of damage drawing. By operating the software keyboard K33, it is possible to collectively manipulate the entirety of damage drawing for each damage group. The software keyboard K33 includes a button B321 used to change a size of damage drawing and a button B322 used to delete the damage drawing.

In this connection, it is possible to further write other damage groups subsequent to writing each damage group.

As described above, the operation input part 130 receives inputs of damage drawing. The display 120 displays damage drawing and target figures overlaid with each other. The damage-related information manager 193 is configured to record the input damage drawing separately from target figures in connection with target figures.

Since the damage-related information manager 193 may record damage drawing separately from target figures in connection with target figures, it is unnecessary to transmit target-figure data when the communication part 110 transmits the damage-related information to the server equipment 200. In this sense, the inspection assistance device 100 is able to suppress an amount of communications with the server equipment 200 when assisting inspections.

In addition, the operation input part 130 receives inputs of damage information, i.e. damage-related information. The damage-related information manager 193 records damage drawing in connection with damage information with respect to the same damage.

Since the damage-related information manager 193 may record damage drawing in connection with damage information with respect to the same damage, it is possible for the display 120 to display damage drawing in connection with damage information. Since the display 120 may display damage drawing in connection with damage information, it is possible to indicate a correlation between damage drawing and damage information.

The operation input part 130 receives an input reference line indicating a correlation between damage drawing and damage information. The damage-related information manager 193 records damage drawing and damage information for the same damage in connection with the reference line.

Accordingly, since the damage-related information manager 193 may record damage drawing and damage information for the same damage in connection with the reference line, it is possible for the display 120 to indicate a correlation between damage drawing and damage information by displaying the reference line.

The display 120 displays the reference line with the first end (i.e. the arrowhead) which is overlaid with damage information or which is disposed in proximity to damage drawing. In addition, the display 120 displays damage information in proximity to the second end (i.e. the end opposite to the arrowhead) of the reference line opposite to the first end.

Regarding the foregoing display operation, it is possible for the display 120 to display a correlation between damage drawing and damage information using the reference line.

In addition, the display 120 displays damage drawing in a display manner depending on damage information input to the operation input part 130.

Accordingly, it is unnecessary for an operator to separately input a display manner of damage drawing.

The repair necessity determination part 194 determines a necessity or a degree of repairing damages depicted by damage drawing based on the position of damage drawing and the damage information.

The inspection assistance device 100 is configured to display results of determining a necessity or a degree of repairs, thus assisting an operator to determine a necessity of repairs. An operator may consider a necessity or a degree of repairs with reference to the determination results of the repair necessity determination part 194.

The repair necessity determination part 194 is configured to determine a necessity or a degree of repairing damages depicted by damage drawing based on areas of target figures, determination-standard information, and the position of damage drawing.

Accordingly, the repair necessity determination part 194 is able to determine a necessity or a degree of repairs using an appropriate determination standard among determination standards for determination-standard areas.

The damage information includes damage types and numerical values representing various properties relating to damages. The determination-standard information describes a relationship between areas (or determination-standard areas) and determination standards regarding a necessity of repairing damages with respect to each type of damages. The repair necessity determination part 194 determines a necessity or a degree of repairing damages based on determination standards and areas relating to damage types indicated by damage information in area information.

Since the repair necessity determination part 194 makes decisions based on determination standards and areas relating to damage types, it is possible to determine necessity or a degree of repairs using an appropriate determination standard on the condition that different determination-standard areas are set to each type of damage.

The display 120 displays damage drawing and determination standards overlaid with target figures.

Accordingly, an operator is able to write damages at appropriate positions with reference to determination-standard areas displayed on screen.

Vector figures are used to illustrate damage drawing and determination-standard areas.

Accordingly, it is possible to reduce a storage capacity required to store image data since the inspection assistance device 100 uses vector data.

The operation input part 130 inputs types of damage drawing received by itself. The type of damage drawing includes a damage group consisting of a plurality of damages. The damage-related information manager 193 records a single damage drawing including a plurality of damages input to the operation input part 130 when the operation input part 130 inputs a damage type corresponding to a group of damages.

Upon inputting a series of damages as a damage group, it is unnecessary for an operator to input types of damage drawing when inputting individual damages.

In addition, the damage drawing includes the representative damage drawing representing damages commonly occurring in multiple target parts of the same type installed in the same device, and the individual damage drawing representing damages individually occurring in an individual target part among multiple target parts. The display 120 is configured to display representative damage drawing and individual damage drawing overlaid with target figures illustrating individual target parts.

Accordingly, it is unnecessary for an operator to individually write damages commonly occurring in multiple target parts since the display 120 may display representative damage drawing and individual damage drawing overlaid with target figures.

The display 120 is configured to display images of objects overlaid with layers, and therefore it is possible to set a decision whether or not to display an image for each layer. The display 120 may selectively display a displayable layer of an image among images having layered structures.

Accordingly, it is possible for an operator to solely display an image, among overlaid images that are difficult to observe with the operator's eyes, on the display 120 since the display 120 may selectively display a displayable layer of an image among images having layered structures. In this sense, the display 120 is able to display images in an easy-to-observe manner with operator's eyes.

In this connection, it is possible to store programs, which are coded to achieve the entire function or partial functions of the controller 190, on computer-readable storage media, and therefore it is possible to carry out processes of various parts by executing programs, stored on storage media, loaded into computer systems. Herein, the term "computer system" may include an operating system and hardware such as peripheral devices.

The term "computer-readable storage media" may refer to flexible disks, magneto-optical disks, ROM, portable media such as CD-ROM, and storage devices such as hard disks embedded in computer systems. The aforementioned programs may achieve parts of functions, or they can be combined with pre-installed programs of computer systems to achieve the foregoing functions.

Heretofore, the embodiment of the present invention has been described with reference to the drawings; however, concrete configurations are not necessarily limited to the foregoing embodiment, and therefore the present invention may embrace any design changes without departing from the essence of the invention.

INDUSTRIAL APPLICABILITY

The foregoing embodiment of the present invention relates to an inspection assistance device including a damage drawing input part configured to receive an input damage drawing, i.e. a drawing representing damages of target parts, a display configured to display the damage drawing and target figures illustrating the target parts, which are overlaid with each other, and a storage configured to store the input damage drawing separately from the target figures in connection with the target figures.

According to the foregoing embodiment, it is possible to suppress an amount of communications when assisting inspections to communicate with the server equipment.

REFERENCE SIGNS LIST

1 inspection assistance system
100 inspection assistance device
110 communication part
120 display
130 operation input part
180 storage
190 controller
191 input processing part
192 display controller
193 damage-related information manager
194 repair necessity determination part
200 server equipment

The invention claimed is:

1. An inspection assistance device comprising:
a processor for executing the following parts:
a damage drawing input part configured to input a damage drawing representing damage of a target part in association with an image of the target part and to input a reference line to be drawn in an input mode of the reference line;
a damage information input part configured to input damage information corresponding to a shape of damage, a character string including a type of the damage and a numerical value representing a property of the damage; and
a display configured to display a target figure illustrating the target part in a plurality of layers such that a layer of the damage drawing differs from a layer of the damage information and to temporarily hide or display the layer of the damage drawing or the layer of the damage information with selectively changing a size of overlaid layers,
wherein upon inputting the damage information in addition to the damage drawing, the display is configured to display the damage information and the reference line in addition to the damage drawing and the image of the target part, and wherein the damage information is displayed in proximity to one end of the reference line while an opposite end of the reference line is disposed in proximity to the damage drawing or disposed to partially overlap the damage drawing.

2. The inspection assistance device according to claim 1, further comprising a storage configured to store the damage drawing and the damage information correlated with each other with respect to same damage.

3. The inspection assistance device according to claim 2, wherein the damage information input part inputs a reference line representing a correlation between the damage drawing and the damage information, and wherein the storage stores the damage drawing, the damage information, and the reference line which are correlated with each other with respect to the same damage.

4. The inspection assistance device according to claim 2, wherein the display displays the damage drawing in a display manner according to the damage information input to the damage information input part.

5. The inspection assistance device according to claim 2, further comprising a repair necessity determination part configured to determine necessity or a degree of repair of the damage indicated by the damage drawing based on a position of the damage drawing and the damage information in association with a determination-standard area among a plurality of determination-standard areas which are set to the image of the target part.

6. The inspection assistance device according to claim 5, wherein the repair necessity determination part determines the necessity or the degree of repairing the damage indicated by the damage drawing based on determination standard information representing a relationship between the determination-standard area of the target figure and a determination standard for determining whether or not to repair the damage in the area, and the position of the damage drawing.

7. The inspection assistance device according to claim 6, wherein the damage information is a character string including a type of damage and a numerical value representing a property of the damage, wherein the determination standard information is information describing the relationship between the determination-standard area of the target figure and the determination standard for determining whether or not to repair the damage in the area with respect to each damage type, and wherein the repair necessity determination part determines the necessity or the degree of repairing the damage based on the determination-standard area and the determination standard correlated with the type of the damage in the determination standard information.

8. The inspection assistance device according to claim 6, wherein the display displays the damage drawing and the determination-standard area overlaid with the target figure.

9. The inspection assistance device according to claim 8, wherein the damage drawing and the determination-standard area are each represented using a vector figure.

10. The inspection assistance device according to claim 1, further comprising a type input part configured to receive the type of the damage drawing input to the damage drawing input part, wherein the type of the damage drawing includes a damage group consisting of a plurality of damages, and wherein the storage stores a single damage drawing to represent a plurality of drawings input to the damage drawing input part when the type of the damage drawing input to the type input part corresponds to the damage group.

11. The inspection assistance device according to claim 1, wherein the damage drawing provides a representative damage drawing representing damage that commonly occurs in multiple target parts of a same type installed in a same device and an individual damage drawing representing damages occurring in an individual target part among the multiple target parts, and wherein the display differently displays the representative damage drawing regarding the multiple target parts and the individual damage drawing regarding the individual target part, which are overlaid with the target figure illustrating the individual target part.

12. The inspection assistance device according to claim 10, wherein upon inputting a damage group of the damage drawing, a first damage item is written by selecting a line or an area as a type of the damage drawing while a second damage item or its subsequent damage item is written by setting a same type identical to the type of the damage drawing for the first damage item.

13. The inspection assistance device according to claim 11, wherein the damage information input part uses a software keyboard to input the damage information such that the software keyboard shows a plurality of serial numbers for a plurality of target parts, and wherein designating a serial number causes its target part to be precluded from the representative damage drawing.

14. The inspection assistance device according to claim 2, wherein the display displays a software keyboard showing a plurality of input buttons each having an abbreviation predetermined for each type of damage, and wherein the damage information input part inputs the type of damage included in the damage information by way of a touch operation applied to an input button on the software keyboard.

* * * * *